Patented May 2, 1950

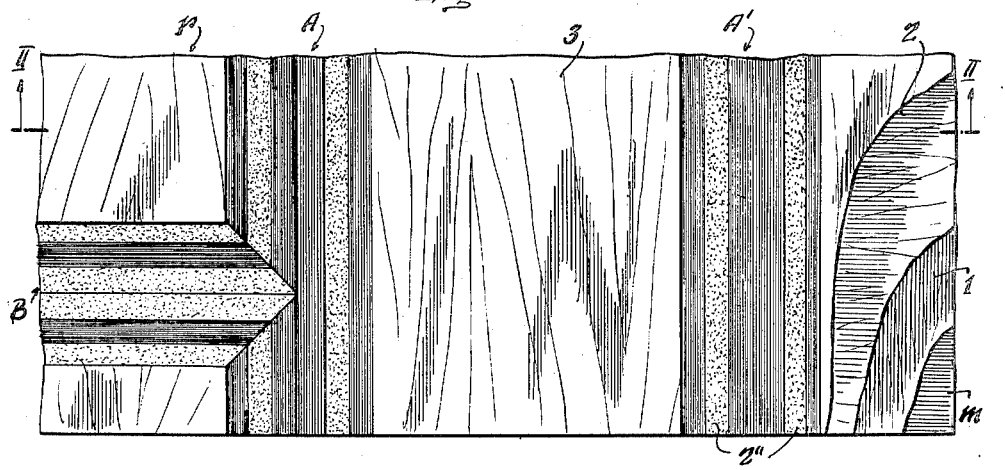
Fig. I
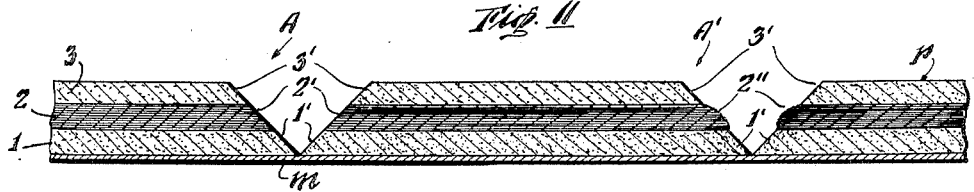
Fig. II
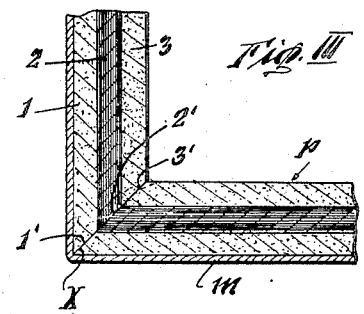
Fig. III
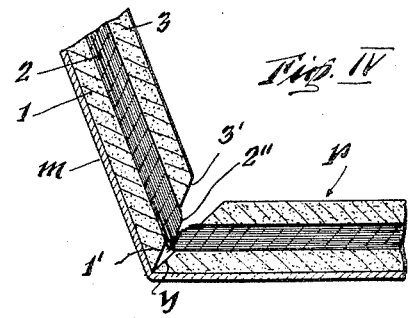
Fig. IV
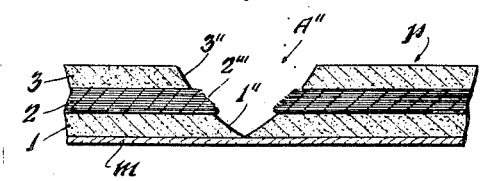
Fig. VIII
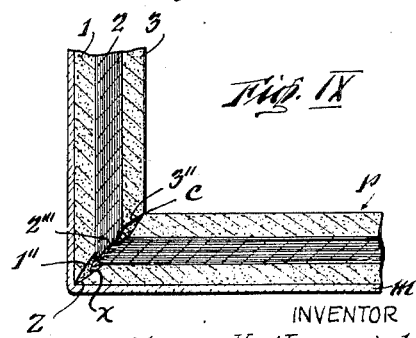
Fig. IX
INVENTOR
Glenn H. Norquist
BY
Austin, Wilhelm & Carlson
ATTORNEYS

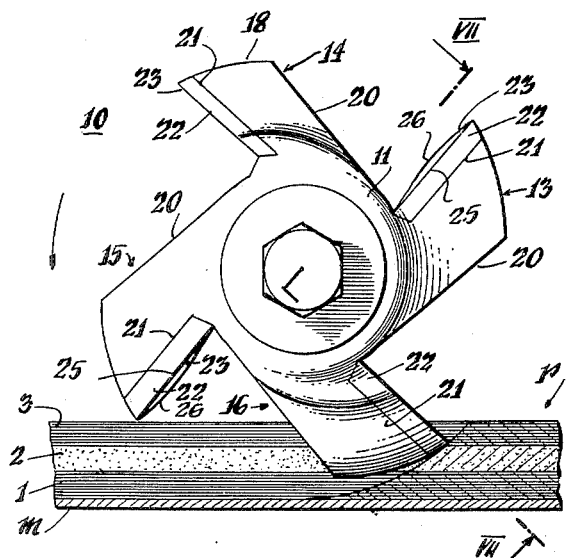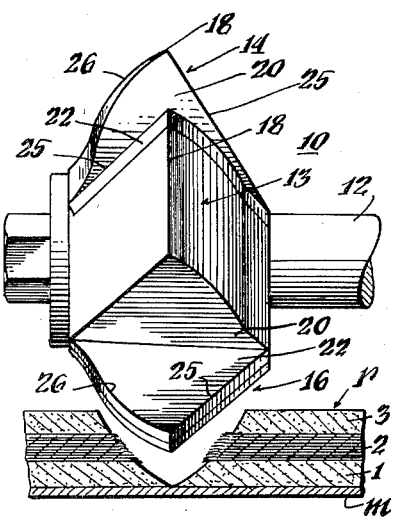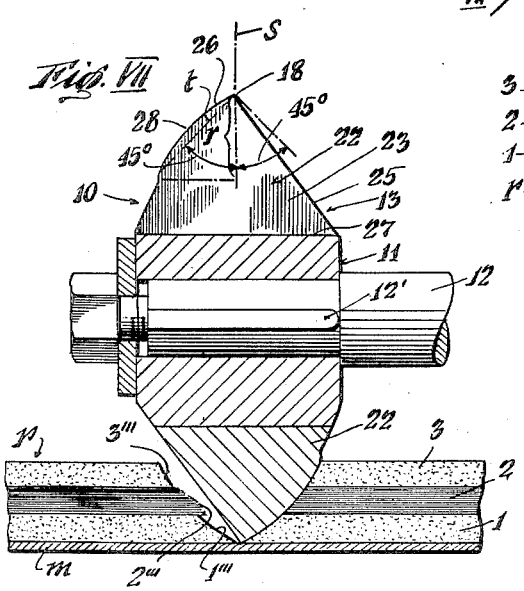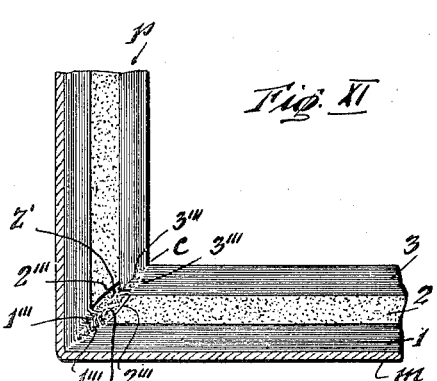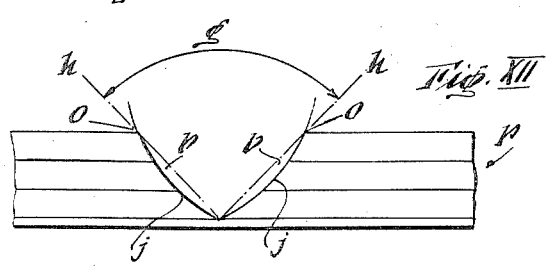

2,505,789

UNITED STATES PATENT OFFICE 2,505,789

GROOVING LAMINATED PLYWOOD

Glenn H. Norquist, Jamestown, N. Y.

Original application December 12, 1945, Serial No. 634,432. Divided and this application January 29, 1948, Serial No. 5,042

4 Claims. (Cl. 20—92)

This invention relates to grooving laminated plywood and more particularly to an improved grooving wheel and method of grooving laminated plywood to permit accurate angular formation thereof. This application is a division of my copending application Serial No. 634,432 filed December 12, 1945.

In the manufacture of numerous fabricated products from laminated plywood panels, and particularly metal clad plywood panels comprising plywood having a metal facing sheet bonded to one side thereof, it is necessary to form or cut grooves extended substantially through the plywood to permit angular shaping of the panel. The plywood base sheet forming a constituent part of such metal clad panels is formed from a plurality of layers of wood or veneer, with the grain of the wood layers extending in different directions so that when the layers are bonded together as by resinous or similar adhesives, the composite base sheet will be of substantially equal strength in all directions.

When the plywood base sheet is groove-cut to permit angular shaping of the sections of the plywood panel, it would normally appear that the groove should be cut to present a V-shaped cross-section with straight inclined faces and with the groove angle formed to accurately correspond to the intended angular position of the panel sections as finally shaped. If, for example, we assume that the panel sections are intended to be shaped at a true 90° angle with respect to one another, it would normally appear that such shaping would be effected if a groove having a 90° angle and presenting straight side faces were cut from the composite plywood base sheet, with the expected result that when the panel sections were shaped into their intended 90° angular relationship, the inclined straight faces of the groove would snugly abut and form a tight hairline joint.

Such normally expected and desirable result cannot in fact be achieved where the composite base sheet is constructed of a plurality of superimposed wood or veneer layers, due to the fact that the layer or layers which are severed transversely of their grain by the grooving tool will "bloom" or "bush out" into the groove because of the resilient character of the wood fibers, while the cut ends of the wood layers which are cut substantially parallel to the grain will remain substantially as cut. This end blooming effect, which is characteristic of wood fibers which are cut transversely of their grain, interferes with and makes impossible the shaping of the panel section to the accurate angular shape intended, unless adequate provision is made to take care of this blooming effect so that the panel sections may be bent into their intended accurate angular relationship.

An object of this invention provides an improved grooving wheel for cutting angular shaped grooves in plywood panels, the grooving wheel being so formed and constructed so as to cut the groove in such shape as to permit accurate angular shaping of the panel sections.

Another object of this invention is to provide an improved grooving tool having cutting arms so shaped and formed as to present curvilinear cutting edges designed to cut the plywood layer in a manner to permit accurate shaping of the panel sections.

Another object of this invention is to provide an improved method for grooving metal clad plywood panels whereby predetermined accurate shaping of the panel sections thereof may be effected.

Another object of this invention is to provide an improved metal clad laminated plywood panel construction presenting a joint of such form as to compensate for the "blooming" effect of the transversely cut plywood layers whereby the panel sections will form into their intended angular relationship.

Other objects of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. I is a fragmentary plan view of a metal clad plywood panel wherein the plywood base sheet is formed from a plurality of laminations having the grain thereof extending in different directions.

Fig. II is a transverse cross-sectional view of the metal clad plywood panel as the same appears when viewed along line II—II of Fig. I.

Fig. III is a cross-sectional view of a metal clad laminated panel which has been grooved and shaped to provide an angular corner with the laminations in hair line abutment at the corner as they theoretically should, but factually do not, appear.

Fig. IV is a fragmentary cross-sectional view of a metal clad plywood panel showing the panel sections shaped as they actually would appear when cut by a 90° angle groove cutting wheel having straight cutting edges, this view illustrating the "blooming" effect characteristic of the laminated wood layer whose ends are cut transversely of the grain, which "blooming" effect prevents the shaping of the panel sections to their intended 90° angular relationship.

Fig. V is a side elevational view of the improved groove cutting wheel shown as it appears when grooving a metal clad laminated plywood panel with the grooving extending generally parallel to the inner and outer laminations and transversely of the intermediate lamination.

Fig. VI is an edge view of the groove cutting wheel in the process of cutting a groove in a metal clad laminated plywood panel.

Fig. VII is a cross-sectional view of the groove cutting wheel as the same appears when viewed along line VII—VII of Fig. V.

Fig. VIII is a fragmentary cross-sectional view of the metal clad laminated plywood panel showing the cross-sectional shape of the groove when cut by the improved groove cutting wheel shown in Figs. V, VI and VII; and Fig. IX is a fragmentary cross-sectional view of the metal clad laminated plywood panel, having a groove shaped as shown in Fig. VIII, after the panel sections have been shaped to their intended right angular relationship.

Fig. X is a fragmentary cross-sectional view of a metal clad plywood panel showing the cross-sectional shape of the groove when cut by the groove cutting wheel, this view shows particularly the "brushing" phenomena resulting when the inner and outer wood layers are cut transversely of the grain run;

Fig. XI is a fragmentary cross-sectional view of the metal clad plywood panel shown in Fig. X when the sections thereof have been shaped to their intended angular relation; and Fig. XII is a diagrammatic illustration of the cutting edges of this improved groove cutting wheel when cutting a laminated plywood panel.

Similar reference characters refer to similar parts throughout the several views of the drawing and specification.

In order to more fully comprehend this invention, there is shown in Figs. I and II a metal clad plywood panel comprising a composite base sheet $p$ having a metal liner sheet $m$ bonded to the base sheet as by a suitable bonding adhesive. The base sheet $p$ comprises a plurality of layers or laminations of wood designated for purpose of description as layers 1, 2 and 3. The grain of the exterior wood layers 1 and 3 are shown as extending in substantially the same direction, while the grain of the intermediate wood layer 2 is shown as running substantially at right angles to the run of the grain in wood layers 1 and 3. The wood layers 1, 2 and 3 are bonded together by a selected bonding adhesive, which may be a phenolic or a urea resin compound, to provide a strong composite plywood panel which has substantially equal strength in all directions.

It has heretofore been the practice in the grooving of metal clad laminated plywood panels to use a grooving tool or wheel having straight cutting faces which normally would be expected to cut and form a groove with straight inclined faces, as would be the case if such cutting tool were used to cut an integral wood block. However in actual practice a grooving tool or wheel having straight cutting faces does not take care of the "blooming" effect characteristic of the cut ends of the wood layers cut transversely of the grain run, with the result that the panel sections cannot be accurately bent or shaped into their intended angular relationship.

For example, by the use of a groove cutting tool with straight cutting faces, it would normally be expected that the groove cut would have a cross-section as shown at A in Fig. II, which groove cut substantially severs the wood layers 1, 2 and 3 comprising the base sheet, the bottom valley of the groove being substantially adjacent the inside face of the metal facing sheet $m$, and with the groove ends 1', 2' and 3' of the wood layers inclined substantially along a straight line. The groove A thus illustrated is imaginary, and would not be attained in practice since the transversely cut ends of the intermediate wood layer 2 would "bloom" or "brush out" and would not lie in straight alignment with the cut ends of the wood layers 1 and 3 whose grain runs substantially parallel to the sides of the groove. Assuming however that the "blooming" phenomena of the transversely cut fibers were not encountered, then a hypothetical groove A as shown in Fig. II presenting a true 90° angle, would permit the panel sections to be bent to their intended 90° angular shape as illustrated in Fig. III, and the inclined faces 1', 2' and 3' of the groove would be in hairline abutment as shown at $x$ in Fig. III.

Where one of the laminated wood layers are transversely severed, a grooving tool or wheel having straight cutting faces will not produce a groove having the cross-sectional shape A as shown in Fig. II and will not permit formation of a hairline joint $x$ as shown in Fig. III, but will produce a groove of the shape indicated at A' of Fig. II wherein the transversely cut layer 2 will "bloom" or "brush out" into the groove, leaving a bloomed or brushed out end 2" extending into the groove and not in alignment with the straight cut faces 1' and 3' of the wood layers 1 and 3 which are cut in the general direction of the grain run. The bloomed ends 2" of the transversely cut layer 2 will prevent the bending and shaping of the panel sections into their intended angular shape.

For example, assuming that the grooving tool having straight cutting faces presenting a 90° angle is used to cut the laminated plywood base sheet, a groove having the cross-sectional contour designated as A' will be produced, and when the panel sections are thereafter bent to an intended 90° relationship, the actual result will be as illustrated in Fig. IV, wherein it will be noted that the bloomed ends 2" of the intermediate layer will be in abutment before the panel sections have been shaped into their intended accurate angular relationship, forming a joint $y$ and the intended accurate angular relationship of panel sections cannot therefore be achieved.

In accordance with this invention, an improved groove cutting wheel is provided which produces a groove presenting a cross section having arcuate shape inclined faces so that the bloomed ends of the transversely cut layers will not interfere with the intended accurate shaping of the panel sections. As shown more particularly in Figs. V, VI and VII, the improved groove cutting wheel 10 is made of tool steel and comprises a hub section 11 secured to any desirable drive shaft 12 as by spline 12'. A plurality of paired cutting arms, shown in Figs. V and VI as four in number and designated as arms 13, 14, 15 and 16, extend outwardly from and are formed integrally with the hub section 11. Each cutting arm is generally tapered from the hub section 11 outwardly, the outer periphery presenting a relatively sharp edge 18, the edge 18 lying in a circular arc whose center is the rotative axis of the hub section 11.

The rear or following face 20 of each of the cutting arms is inclined rearwardly with respect to the direction of rotation and the front or advancing face 21 of each cutting arm is inclined forwardly in direction of rotation. The front advancing face 21 of each arm carries a nib inset 22 made of suitable cutlery steel or tungsten carbide, the nib inset being braised, welded or otherwise fixedly secured so as to form an integral part of the cutting arm. The front or advancing face 23 of the nib inset is relatively flat and is inclined forwardly in the direction of rotation in a plane which is substantially tangent to the shaft hole in the hub section 11.

The advancing face 23 of the nib inset 22 is also sloped in a plane extending diagonally of the axis of the rotation of the wheel, the side edges 25 and 26 of the nib inset forming the cutting edges. The diagonally sloped front advancing face 23 of the nib inset 22 thus presents the cutting edge 26 in advance of the cutting edge 25 as the cutting wheel rotates. The cutting edge 25 is inclined from the hub section 11 to the arcuate extremity 18 along a substantially straight line and thus presents a substantially straight cutting edge. The advance cutting edge 26 has an arcuate or outwardly bulging contour which extends from the tip edge 18 toward the crotch end 27 of the cutting face. The diametrical length $r$ of the curvilinear or arcuate cutting edge 26 should approximate the depth of the groove to be cut.

It will be noted by referring to Fig. VII that the arcuate cutting edge 26 is inclined at a greater angle with respect to the medial line of the wheel designated as line $s$ in Fig. VII, than the straight cutting edge 25. Assuming for example that the groove cutting wheel is designed to groove a laminated plywood panel to permit the sections to be formed into a true right angle, the straight cutting edge 25 is inclined to the medial line $s$ at an angle approximately 35° to 40°, while the outwardly bulging or arcuate edge 26 has its crest point 28 inclined at an angle of approximately 50° to 55° to the medial line $s$; and an imaginary chord line $t$ drawn between the ends of the arcuate cut line 26 would extend at an angle of approximately 45° to the medial line $s$.

It will be further noted by referring to Figs. V, VI and VII that the alternating cutting arms 13 and 15 present their arcuate cutting edge 26 on what might be called the left hand side of the wheel, and the intermediate cutting arms 14 and 16 present their arcuate cutting edge 26 on the right hand side of the wheel. Likewise the cutting arms 13 and 15 present their straight cutting edge 25 on the right hand side of the wheel and the intermediate cutting arms 14 and 16 present their straight cutting edge 25 on the left hand side of the wheel. Thus it will be appreciated that when the groove cutting wheel is rotated to cut the laminated plywood panel, the cutting arms 13 and 15 will cut a groove having a straight inclined side face on the right hand side thereof and an arcuate side face on the left hand side thereof, and the intermediate cutting arms 14 and 16 traveling along the same groove will give the right hand face of the groove an arcuate contour. It will also be appreciated that as the panel is advanced under the rotating cutting wheel and in contact therewith, each of the cutting arms will cut an incremental slice from the front end of the groove and remove the sliced material therefrom. Due to the sloped inclination of the advancing face 23, the advance arcuate cutting edge 26 will have a more pronounced cutting effect than the following straight cutting edge 25. It is therefore preferable to rotate the cutting wheel at sufficiently high speed with respect to the movement of the panel thereunder, so that the straight and more blunt cutting edge 25 is not substantially relied upon to cut the panel, and the advance arcuate cutting edges 26, which are presented on alternate sides of the successive advancing cutting arms, perform the cutting work. When the panel material has passed to the rear of the cutting wheel, both side faces of the groove will be of arcuate cross sectional shape.

Assuming for example that the metal clad laminated plywood sections are to be finally shaped in right angular relationship as shown in Fig. IX, the wood layers 1 and 3 which are cut in the direction of the grain will present slightly arcuate ends 1″ and 3″ and will remain substantially as cut. The wood layer 2 cut transversely of the run of the grain will present "bloomed" or "brushed out" ends 2‴ extending into the groove A″. When the panel sections are bent to their intended right angular relationship, a joint $z$ is formed as shown more particularly in Fig. IV wherein the "brushed out" ends 2‴ of the intermediate wood layer 2 will be in tight abutment, and the ends 3″ of the outer wood layer 3 will be in abutment at their outer extremity, as at $c$. The joint $z$ thus formed presents an interior space adequate to receive and contain the "bloomed" out ends 2‴ of the transversely cut plywood layer 2. The interior space of the joint $z$ may be packed with a suitable bonding adhesive.

The improved groove cutting wheel will perform its function of forming a groove in laminated plywood to permit shaping or forming of the sections to predetermined accurate shape, even though the inner and outer wood layers of the plywood base sheet are cut transversely the run of the grain. There is shown in Figs. I and X a groove B but with this groove cutting wheel and wherein the groove B extends transversely of the grain of the inner and outer wood layers 1 and 3 and substantially parallel of the grain of the intermediate wood layer 2. Due to the arcuate shaping of the side faces of the groove, the panel sections may be formed into their intended accurate angular arrangement as shown in Fig. XI even though the cut ends 1‴ of the wood layer 1 and the cut ends 3‴ of the wood layer 3 have "bloomed" or "brushed out" into the groove. Since the fibers of the "brushed" ends 1‴ and 3‴ of layers 1 and 3 are to a certain extent flexible and deformable, the panels can be accurately shaped when space at the joint is provided to permit such deformation.

Such space is provided by the concave cut ends 2″ of the intermediate wood layer 2 which remains substantially as cut, and consequently provided a slight cavity between the ends 2″, forming a joint $z'$ as shown in Fig. XI. This cavity between the spaced ends 2″ of wood layer 2 permits of certain bending or bulging movement of the "brushed" ends 1‴ and 3‴ into this cavity. Furthermore, since the bloomed ends 1‴ and 3‴ of the wood layers 1 and 3 have been cut with a certain cavity by the curvilinear cutting edge 26 of the grooving wheel, there remains a more limited but yet clearly definable space between the cut ends 1‴ and 3‴ into which the brushed fibers may lodge. The space within the interior of the joint z' may also be packed with a suitable bonding adhesive, x.

It will thus be appreciated that laminated plywood sections may be shaped to their intended angular relationship by forming the groove with generally arcuate wall surfaces in which the side faces are slightly concave. For example, if we assume as shown in Fig. XII that the intended angularity between the sections be designated by a predetermined angle g, the groove is then so cut so that an angle g will be presented between the imaginary incline chord lines h extending from the valley of the groove g to the top corner edges o thereof. The concave cut side faces j defined by the curvilinear cutting edges of the grooving wheel are spaced from their respective imaginary chord lines h. Since the imaginary chord lines h will coincide when the panel sections are shaped to their intended angular relationship, the cavity v defined between each arcuate wall surface j and the adjacent imaginary chord line h provides the necessary space to receive the "bloomed" or "brushed out" ends of those wood layers which are cut transversely of the grain. Since the fibers of the "brushed out" ends of the transversely cut layers are to a certain degree flexible, the fibers in the "brushed out" ends will flex and become accommodated to the cavity v provided therefor, thereby permitting the panel sections to be shaped to their intended angular relationship irrespective of the number of wood layers in the laminated plywood base sheet, and irrespective of which layers have been transversely cut.

It is thus seen that this improved groove cutting wheel possesses characteristics which permit the grooving of laminated plywood panels in a manner to insure predetermined accurate angular formation of the panel sections. Any unfilled cavity space between the grooved ends of the panel sections may be filled with a suitable bonding adhesive which gives strength to the joint.

While certain novel features of the invention have been disclosed herein, and are pointed out in the annexed claims, it will be understood that various omissions, substitutions and changes may be made by those skilled in the art without departing from the spirit of the invention.

I claim:

1. An improved metal clad laminated plywood panel construction having sections thereof extending at a predetermined corner forming angle with respect to one another with the metal facing sheet forming a continuous and unbroken metal facing for one side of the laminated plywood backing, said sections presenting a biconvex joint defined between the adjacent cut ends of the laminated plywood layers, said cut ends extending down to the metal facing sheet and meeting in a relatively sharply defined angle around which said metal facing sheet is bent, said adjacent cut ends being generally arcuate in shape with the exterior and interior extremities thereof in firm abutment, the interior of said joint presenting an open biconvex space for the reception of the bloomed ends of the transversely cut plywood layers.

2. An improved metal clad laminated plywood panel construction having sections thereof extending at a predetermined corner forming angle with respect to one another with the metal facing sheet forming a continuous and unbroken metal facing for one side of the laminated plywood backing, said sections presenting a biconvex joint defined between the adjacent cut ends of the laminated plywood layers, said cut ends extending to the metal facing sheet and meeting in a relatively sharply defined angle around which said metal facing sheet is bent, said adjacent cut ends being generally arcuate in shape with the exterior and interior extremities thereof in firm abutment, the interior of said joint presenting an open biconvex space having curvilinear faces for the reception of the bloomed ends of the transversely cut plywood layers, and a bonding adhesive within said joint.

3. An improved metal clad laminated plywood panel designed to be shaped into sections which extend at a predetermined corner forming angle with respect to each other, said metal clad plywood panel comprising a plywood backing having a metal facing sheet adhesively bonded to one face thereof, said plywood backing comprising a plurality of adhesively bonded wood veneer layers with the grain fibres of at least one of said layers extending in a crossing direction to the grain fibres of the adjacent layer, a generally V-shaped groove cut extending substantially through the plywood backing with the valley point of the groove adjacent the inner surface of the metal facing sheet, each of the opposite inclined faces of the groove being cut to present an arcuately convex curvature extending from the outer edges to the valley point of the groove.

4. An improved metal clad laminated plywood panel designed to be shaped to present sections which extend at a predetermined corner forming angle with respect to each other, said metal clad plywood panel comprising a plywood backing having a metal facing sheet adhesively bonded to one face thereof, said plywood backing comprising a plurality of adhesively bonded wood veneer layers with the grain fibres of at least one of said layers extending in a crossing direction to the grain fibres of the adjacent layer, a generally V-shaped groove cut extending substantially through the laminated plywood layers with the valley point of the groove adjacent the inner surface of the metal facing sheet, each of the opposite inclined faces of the groove being cut to present an arcuately convex curvature extending from the outer edge to the valley point thereof, the convex curvature of said inclined groove faces being such that imaginary straight line chords drawn from the valley point of the groove to the outer edge of each of said inclined side faces will be inclined with respect to each other at an angle which substantially equals the intended angular arrangement of the formed panel sections with the valley point of the groove defining the line of bend.

GLENN H. NORQUIST.

REFERENCES CITED

The following references are of record in the file of this patent:

UNITED STATES PATENTS

| Number | Name | Date |
|---|---|---|
| 1,162,524 | Staley et al. | Nov. 30, 1915 |
| 1,484,175 | Elmendorf | Feb. 19, 1924 |
| 1,669,667 | Levine | May 15, 1928 |
| 1,846,881 | Lewis | Feb. 23, 1932 |
| 1,881,734 | Lewis | Oct. 11, 1932 |
| 2,149,882 | Clements | Mar. 7, 1939 |
| 2,253,219 | Alexander | Aug. 19, 1941 |